Jan. 14, 1958   J. J. SEAQUIST   2,819,918

SEAL FOR BALL AND SOCKET JOINT

Filed Feb. 15, 1954

INVENTOR.
James J. Seaquist
BY
Attorney

United States Patent Office 2,819,918
Patented Jan. 14, 1958

2,819,918
SEAL FOR BALL AND SOCKET JOINT

James J. Seaquist, Ingleside, Ill., assignor to McGraw-Edison Company, a corporation of Delaware Application February 15, 1954, Serial No. 410,349

1 Claim. (Cl. 287—90)

This invention relates to an improved means for sealing against dirt and moisture the relatively movable parts of a ball and socket joint such as that disclosed in copending application of Thorsten Fjellstedt, Serial No. 409,694, filed February 11, 1954 and assigned to the assignee of this invention. The seal disclosed herein is also shown in the aforementioned application although it is not there specifically claimed.

Ball and socket joints, or universal joints, as they are sometimes denominated, are frequently inserted between elements in a mechanical system where transmission of an axial force from one element to the other is desirable despite appreciable misalignment between them. To accommodate this misalignment, the joints are generally provided with a socket connected to a force receiving shaft which socket is adapted to freely embrace and retain thereagainst a ball connected to a force delivering shaft disposed in an axially opposed direction.

Frequently, in actual practice, grit, ice, water or other erosive contaminants enter the minute space between the socket and periphery of the ball to such extent as to interfere with free relative movement between the ball and socket, thereby rendering it useless as a flexible misalignment compensating means. Several types of seals have been developed heretofore for protecting the relatively movable parts of a ball and socket assembly from contaminants as well as to prevent any lubricant from leaking out of the assembly. Among these are the ordinary concentric corrugated bellows which completely encompasses the ball and socket and is tightly clamped to a shaft leading from either side. While a bellows may be effective as a seal for most purposes, it has the disadvantage of being costly and unadaptable for use where it is desirable to rotate the connected shafts through one or more axial revolutions, because each end of the bellows must be fixedly clamped to an adjacent shaft, thereby submitting it to severe torsional stress.

Another available form of seal for a ball and socket joint is that which has a neck portion adapted to clamp onto the shaft appended to the ball and a body portion adapted to slidably overlie the ball receiving socket to permit relative motion between the ball and socket, thus excluding contaminants. Prior art seals of this type are generally not as effective as they might be because they have a tendency to distort or bunch up when they are urged against the socket by swivelling of one shaft with respect to the other. This distortion frequently causes an opening to occur along the sealing surface permitting entrance of contaminants into the ball and socket joint.

The principal object of this invention is to overcome the above noted defects by providing a seal which lies snugly against the ball housing regardless of the degree of misalignment between the connected parts.

Another object is to provide a seal having sufficient elasticity to tightly embrace the relatively movable parts without requiring any additional clamping means.

Still another object is to provide a seal which is easy to use and which can be easily manufactured.

Other objects will appear throughout the following specification.

Refer now to the drawing in which.

Like reference numerals refer to like parts throughout the various views.

Figure 1:
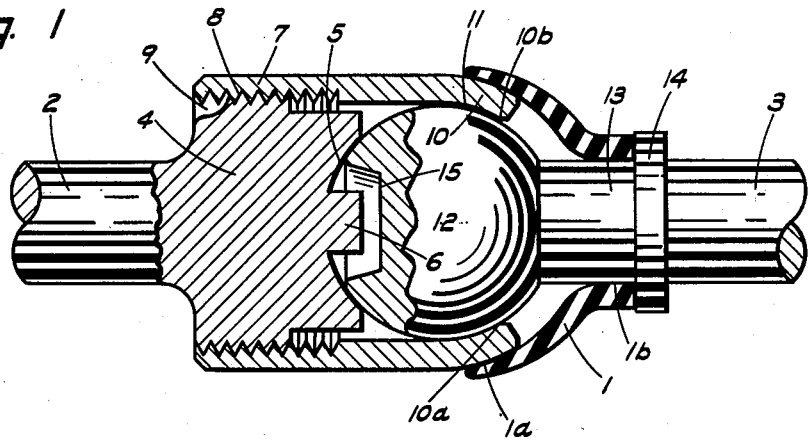
Fig. 1 is a sectional view of a ball and socket assembly showing the novel seal installed thereon.

The novel seal 1 will be described in relation to Fig. 1 where a ball and socket joint is shown arranged to transmit a tensile or compressive force substantially coincidental to the axes of shafts 2 and 3.

Referring to that figure the joint is seen to comprise a force transmitting shaft 2 having a larger diameter threaded end plug 4 integral therewith. The extreme end of plug 4 has an arcuate configuration similar to a segment of a sphere which defines a bearing surface 5. A cylindrically shaped stop 6 projects coaxially from bearing surface 5 and acts as a means to limit the degree of swivel of the joint, as will be more fully explained hereinafter.

A housing 7 is engaged to plug 4 by means of threads 8. To assure that housing 7 will maintain the proper position relative to plug 4, provision is made for staking the housing 7 into a recess in the periphery of the threads as indicated by the reference numeral 9. The margins 10 at one end of housing 7 converge concentrically inward toward the axis of the housing to define an arcuate internal bearing surface 11 having a radius of curvature identical with that of bearing surface 5 at the end of plug 4. Hence, when housing 7 is screwed onto plug 4 a proper distance, the segments of bearing surfaces 5 and 11 combine to form a smooth, confluent spherical socket extending from 10a to 10b as is evident from Fig. 1.

Figure 2:
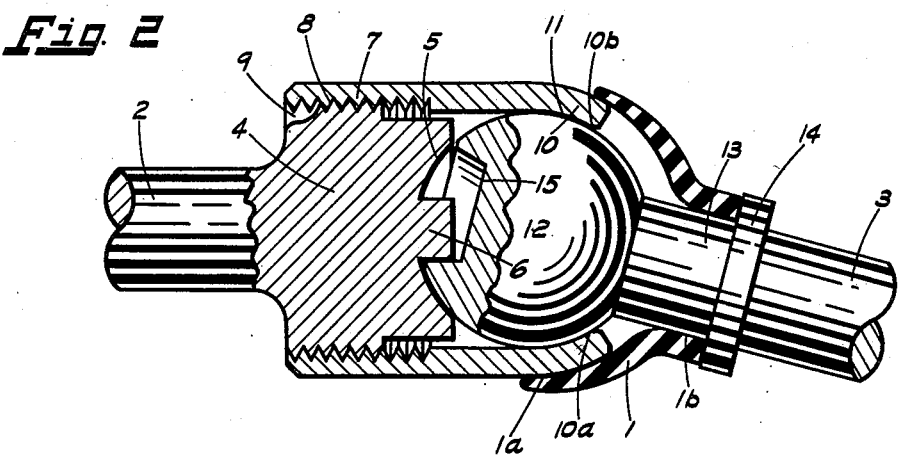
Fig. 2 shows the ball and socket assembly of Fig. 1 in axial misalignment.

A ball 12 having a radius of curvature similar to the socket is disposed in the latter with its periphery in bearing relation to the bearing surface extending from 10a to 10b. Obviously, the ball 12 cannot withdraw from housing 7 because it is embraced by the margins 10 over the principal part of its periphery. It is further evident that the ball is free to rotate within the socket or swivel with respect to the axes of shafts 2 and 3 as illustrated in Fig. 2. A recess 15 in the periphery of ball 12 receives projection 6 and acts to limit peripheral movement of the ball in respect to bearing surface 5 of plug 4.

Ball 12 has an integral neck portion 13 extending therefrom which terminates in a shoulder portion 14. The novel seal 1 is disposed concentrically upon neck 13 and is prevented from sliding relative thereto by shoulder 14.

Seal 1 is preferably made of silicone rubber although other resilient materials having similar resistance to the adverse effects of water, ice, heat and solvents such as oil, may be used. As illustrated, seal 1 has a hemispherical configuration defining an internal concave working surface 1a which bears snugly but slidably against margin 10. It is evident, therefore, that the seal 1 completely encloses the opening in housing 7, thus preventing the silicone base lubricating grease with which the housing may be filled from working out and further preventing entry of erosive contaminants which may impair free movement of the ball within the socket.

Attention is now directed to Fig. 2 which shows the ball and socket assembly swivelled into a position where the axis of shaft 3 is askew to the axis of shaft 2 such as may be the case where the assembly is used to interconnect two switch operating levers (not shown) disposed in different horizontal planes. Note that despite severe misalignment of shafts 2 and 3 that concave working surface 1a of seal 1 continues to conform snugly to the contour of converging margins 10 without leakage spaces appearing therebetween and without distortion or wrinkling of seal 1. Theoretically, of course, some distortion would occur if the degree of misalignment between shafts 2 and 3 became excessive, but in this case misalignment is limited by the projection 6 abutting the walls of stopping recess 15.

It is to be appreciated that the distortion accompanying flexing of sealing means heretofore known to the art is avoided in the instant invention by having all arcuate surfaces which are movable relative to each other generated from a single point or center of curvature. In this invention the peripheral surfaces of the sphere, arcuate bearing surfaces 5 and 11, the surface of margin 10 and concave working surface 1a are all defined by arcs generated from a single point at the center of ball 12. Hence, the effect is similar to having a plurality of hollow balls, one within the other, with each of their centers coincidental; regardless of the peripheral rotation of any of the balls, one will have no effect upon the others.

Figure 3:
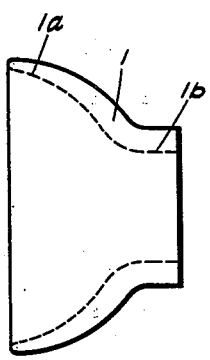
Fig. 3 is an elevational view of the seal.

Refer now to Fig. 3 where the novel seal is shown isolated from the ball and socket assembly of Figs. 1 and 2. Note that the inner surface 1a and the throat portion 1b contract radially inwardly when the seal 1 is isolated, the seal only assuming its true working shape when installed as shown in the other figures. Note also that throat 1b will tend to contract radially so that it must be stretched to a snug water-tight fit on neck 13, thereby eliminating the need for any means of clamping the seal to the neck portion 13 of ball 12.

It is claimed:

In a ball and socket assembly for connecting a pair of substantially longitudinally aligned shaft means in articulate tiltable relation with respect to each other, said assembly including a plug member coaxial and integral with one of said shaft means and having a concave face generated from a center of curvature, a cylindrical housing having a uniformly thick wall concentrically embracing said plug member at one end; a converging arcuate margin at the other end of said housing having an interior surface and a convex surface generated from the same aforementioned center of curvature, a ball in confluent bearing relation with said interior surface and concave face, a neck portion extending integrally from said ball outwardly from said housing, shoulder means affixed circumjacent said neck portion and spaced from the margin of said housing, in combination wtih a silicone rubber seal having a substantially hemispherical body portion generated from the aforesaid common center of curvature of the concave plug member face, of the converging arcuate margin, and of the ball, said hemispherical body portion also having an integral throat portion, said body portion freely and flexibly extending from said throat portion into sealing overlying relation with the convex margin of said housing and said throat portion sealingly surrounding said neck portion and sealingly abutting said shoulder means.

References Cited in the file of this patent

UNITED STATES PATENTS

| 782,330 | Foster | Feb. 14, 1905 |
| 2,206,972 | Niles | July 9, 1940 |
| 2,424,431 | Booth | July 22, 1947 |
| 2,470,210 | Booth | May 17, 1949 |
| 2,624,829 | Dzaack | Jan. 6, 1953 |
| 2,687,024 | George | Aug. 24, 1954 |

FOREIGN PATENTS

| 273,945 | Germany | May 1, 1914 |